Sept. 18, 1951 J. L. REED 2,568,411
ELECTRIC HEATING SYSTEM
Filed March 9, 1949 2 Sheets-Sheet 1
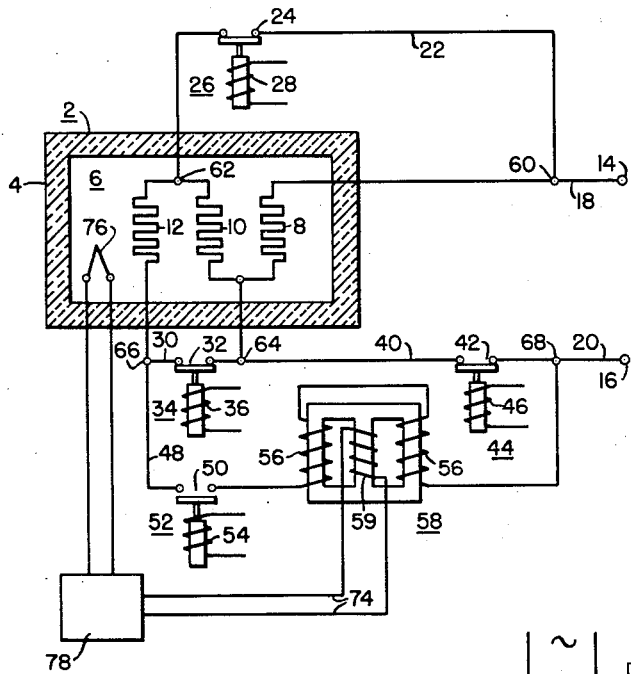
Fig. 1.
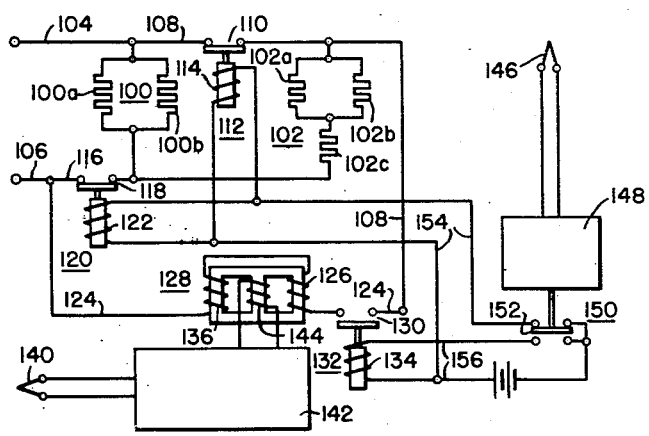
Fig. 2.
Fig. 3.
WITNESSES:
Robert A. Baird
Wm. C. Groove
INVENTOR
James L. Reed.
BY
B. K. Zanguiel
ATTORNEY Sept. 18, 1951   J. L. REED   2,568,411
ELECTRIC HEATING SYSTEM
Filed March 9, 1949   2 Sheets-Sheet 2

WITNESSES:
Robert C. Baird
Nw. L. Groove

INVENTOR
James L. Reed.
BY
B. L. Zaugall
ATTORNEY

Patented Sept. 18, 1951

2,568,411

UNITED STATES PATENT OFFICE 2,568,411

ELECTRIC HEATING SYSTEM

James L. Reed, Buffalo, N. Y., assignor to Westinghouse Electric Corporation, East Pittsburgh, Pa., a corporation of Pennsylvania Application March 9, 1949, Serial No. 80,404

18 Claims. (Cl. 219—20)

My invention relates to electric heating means having electric heating resistors that heat the heating means when electric current is passed through them. More particularly, my invention relates to resistor-type electric furnaces provided with temperature-responsive means and a regulator controlled thereby for regulating the supply of electric power to the heating resistors so as to maintain the temperature of the furnace at some desired level or predetermined value with a high degree of accuracy.

In more conventional types of furnace systems to which my invention pertains, the power supplied to the furnace heating resistors is controlled by controlling the voltage across the heating resistors or by connecting them in different series, parallel, and series-parallel circuit arrangements. In the former instance, a voltage-controlling device is connected to the heating resistors for controlling the voltage across them. For suitable and accurate temperature control of the furnace, such a device must be able to regulate the power delivered to the heating resistors when the demand for heat is exceptionally high, and also when the demand for heat is fairly constant but relatively low. The former situation usually ocurs when a cold furnace is being brought into operation; and the latter usually occurs when a heated charge is being soaked in the furnace or is being permitted to change slowly in temperature. Accordingly, the regulating devices of conventional electric furnace systems must have an operating range that extends from the high power supplied during, for example, the furnace heating-up periods, to the much lower power supplied during, for example, soaking or operating periods. Such a regulating means can be fairly expensive in cost.

An object of my invention is to provide an electric furnace system or equivalent electric heating means of a type described in which different circuit arrangements for the heating resistors are combined with a regulating means in such a manner that the regulating means is not called upon to carry the high currents or high power that may sometimes be delivered to the heating resistors, so that a smaller regulating means can be used than would be the case otherwise. I accomplish this object by limiting the current and voltage values which the regulating means is required, at any time, to handle. The magnitudes are much lower than the full current-rating or full voltage-rating of the heating resistors of the electrical furnace to which the invention is applied. Consequently, a flexible heating system embodying my invention can be installed at less cost than a similar heating system of the same rating using a regulating means having a K. V. A. rating for handling the maximum rated capacity of the heating resistors.

For illustrating my invention, I show a regulating system of a type using a saturable core reactor having a variable impedance winding that can be connected in series with the heating resistors of the furnace. The impedance of this winding determines the voltage across the heating resistors. A system of this kind is shown in the patent to K. P. Puchlowski, No. 2,445,454, dated July 20, 1948. In said system, line voltage is applied across a series circuit comprising the A. C. winding of the saturable core reactor and the heating resistors of an electric furnace. By varying the current in the D. C. control winding of the saturable core reactor in accordance with the temperature of the furnace, the A. C. winding can be made to offer more impedance when the heat demanded by the furnace is relatively less, and vice versa. Consequently, the voltage across and the current through the heating resistors are regulated in accordance with the temperature of the furnace. Because the A. C. winding is permanently in series with the heating resistors, it must be designed to carry the full-rated current of the heating resistors when the impedance of the A. C. winding is at a minimum, and also to withstand almost the full-rated voltage when the impedance is at a maximum.

In accordance with my invention, the heating resistors of a furnace are divided into several sections of heating resistors. The sections can be connected selectively with all of them in a series circuit arrangement across the power supply line. The A. C. winding of a saturable core reactor is used for regulating purposes only when the full desired number of heating resistors are in the series-circuit arrangement. In the series-circuit arrangement, the maximum current that can be carried by the heating resistors is limited to a value much less than the current that can be carried by the resistors in a parallel-circuit or other arrangement; and a saturable core reactor of much lower rating can be used with corresponding savings through the system. In specific forms of my invention, for high heat demand the heating resistors are connected directly, in Y or in delta, to all phases of a three phase line, without the regulating reactor. When the heat demand becomes less, the resistors are connected in series with the reactor across a single phase of the line.

Further objects, features and innovations of my invention will be apparent from the following description of several preferred embodiments thereof. The principles of my invention are, however, not limited thereto. The description is to be taken in conjunction with the accompanying schematic drawings, in which:

Figure 1 is a wiring diagram of an embodiment illustrating a form of circuit connections by means of which the heating resistors of an electric furnace heating means can be controlled in accordance with my invention;

Fig. 2 is a wiring diagram that complements Fig. 1, and shows a scheme by which circuits shown in Fig. 1 can be controlled in response to the temperature of the furnace;

Figs. 3 and 4 are a schematic wiring diagram and a simplified line diagram of another embodiment of my invention.

Figure 4:
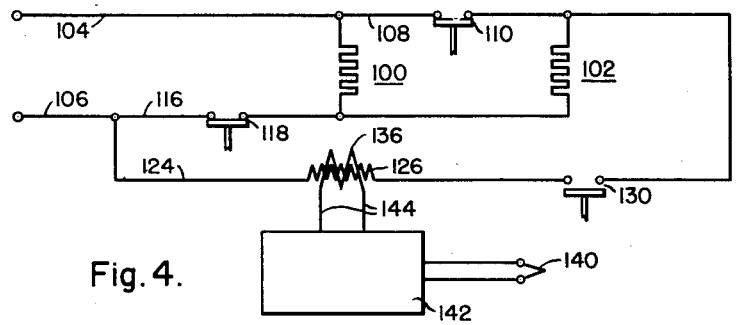

Referring to Figs. 1 and 2, an electric furnace 2 is represented by insulating walls 4 defining a heating chamber 6. The furnace is heated by means of a plurality of heating resistors 8, 10 and 12. I use the term "heating resistors" in a somewhat generic sense as including a single heating element acting as a heating unit or a plurality of heating elements acting together as a heating unit.

In accordance with my invention, the heating resistors 8, 10 and 12 are connectable in different circuit arrangements placing them in series with each other or in parallel with each other across a source of alternating-current electrical power. The A. C. power can be taken from a pair of terminals 14 and 16, through power supply conductors 18 and 20. In accordance with my invention, there is no regulating means provided for the power supply to the heating resistors when they are connected in parallel. However, when they are connected in series, a current regulating means is inserted in series with them.

To effect the different circuit arrangements, a plurality of branch circuits are provided as follows: a first branch circuit 22 which includes contacts 24 of a contactor 26 having an electromagnetic operating coil 28; a second branch circuit 30 which includes contacts 32 of a contactor 34 having electromagnetic operating coil 36; a third branch circuit 40 which includes contacts 42 of a contactor 44 having an electromagnetic operating coil 46; and a fourth branch circuit 48 which includes contacts 50 of a contactor 52 having an electromagnetic operating coil 54 and includes a variable impedance A. C. winding 56 of a saturable core reactor 58. The contacts 50 and the winding 56 are in series. The saturable core reactor has a direct-current control winding 59.

Each of the contactors 26, 34, 44 and 52 is of a type which is normally biased to have its contacts open. Upon energization of its electro-magnetic operating coil, the associated contacts close and complete the branch circuit in which they are connected.

An end of the first branch circuit 22, an end of the heating resistor 8, and the supply conductor 18 are directly electrically tied together to provide, in effect, a junction 60. The other end of this branch circuit 22, an end of the heating resistor 10, and an end of the heating resistor 12 are also electrically tied together to provide, in effect, a junction 62. Considered differently, this branch circuit 22 is connected between and across the ends of the heating resistors 8 and 10, while the opposite ends of these resistors are directly tied together.

An end of the second branch circuit 30, the remaining ends of the heating resistors 8 and 10, and an end of the third branch circuit 40 are electrically tied together to provide, in effect, a junction 64. The other end of the branch circuit 30, the remaining end of the heating resistor 12, and an end of the fourth branch circuit 48 are electrically tied together to provide, in effect, a junction 66. Considered from a different viewpoint, the branch circuit 30 can be said to be connected across the ends of the heating resistors 10 and 12, while the opposite ends of these heating resistors are directly tied together.

The third branch circuit 40 has an end tied to the aforesaid junction 64, and its other end electrically tied to the supply conductor 20 and to an end of the fourth branch circuit 48 to provide, in effect, a junction 68.

The fourth branch circuit 48 extends between the junction 66 and the junction 68.

The D. C. control winding 59 of the saturable core reactor 58 is in a D. C. circuit 74. The current in the D. C. circuit 74 is controlled in accordance with the temperature of the heating chamber 6 by means of a temperature responsive device 76, in the form of a thermocouple, and a D. C. current varying apparatus 78 of any suitable type, but I prefer that shown in the aforesaid Puchlowski patent. Briefly, in a particular system of this kind, as shown in Fig. 2, the thermocouple 76 controls a polarized control relay 80 having a contact 82. The operation of the relay 80 and hence the contact 82 are determined through a comparison of the E. M. F. of the thermocouple 76 with that of a known voltage source, as described in the aforesaid patent.

Assume that the contact 82 is closed to the left when the thermocouple 76 indicates that the temperature in the furnace is less than the desired value. Under this condition, an energizing circuit 84 to an operating coil 86 of an auxiliary relay 88 is closed. The upper contacts 90 of the relay 88 are bridged and complete an energizing circuit 92 for the electromagnetic operating coils 28, 36 and 46 of the contactors 26, 34 and 44. Consequently, branch-circuits 22, 30 and 40 are closed. With the auxiliary relay 88 energized and its contacts in upper position, the lower contacts 94 of the relay are open, so that a circuit 96 to the operating coil 54 of the contactor 52 is not energized. The contacts 50 are open and the branch circuit 48 is not closed.

Under the foregoing status, the circuit arrangement across the supply conductors 18 and 20 is as follows: One end of the heating resistor 8 is directly connected to the junction 60, and its other end is directly connected to the junction 64. Similarly, one end of the heating resistor 10 is connected to the junction 60 through the closed branch circuit 22, and its other end is connected directly to the junction 64. One end of the heating resistor 12 is also connected to the junction 60 through the branch circuit 22, and its other end is connected to the junction 64 through the closed branch circuit 30. Hence, all the heating-resistors have ends connected to the junction 60 and the remaining ends connected to the junction 64, and are in parallel. The junction 60 is directly connected to the supply conductor 18, and the junction 64 is connected to the supply conductor 20 through closed branch circuit 40.

As is known to one skilled in the art, the heating resistors 8, 10 and 12 in parallel will draw the highest possible current from the supply conductors 18 and 20 as compared to the current drawn by any other circuit-arrangement of the heating resistors; and the furnace is supplied with power at the highest rate possible. It is also to be observed that no current passes through the branch circuit 48 that has the A. C. winding 56 of the saturable core reactor 58 in it. This branch circuit 48 is, in effect completely short-circuited by the completed branch circuits 30 and 40, and further is itself open at the contacts 50.

When the temperature responsive device 76 indicates that the furnace is near, at or above the desired level, the contact 82 can be made to move either to a neutral position or to the right with respect to Fig. 2, so that the auxiliary relay 88 is deenergized. As a result, the circuit 92 is deenergized and the circuit 96 energized. The contacts 24, 32 and 42 open, and the branch circuits 22, 30 and 40 are interrupted, thereby destroying the parallel-circuit arrangement of the heating resistors 8, 10 and 12, previously described. The operating coil 54 of the contactor 52 is energized. The contacts 50 thereupon close and complete the branch circuit 48. The electrical heating resistors 8, 10 and 12 are now series-connected in a series-circuit arrangement with the A. C. winding 56 of the saturable core reactor 58, as follows: The junction 60, the heating resistors 8, 10 and 12 in series, the junction 66, the closed contacts 50, the A. C. winding 56 and the junction 68 to the supply conductor 20. Accordingly, the regulation of the regulating means 78 and saturable core reactor 58 comes into action and regulates the current supplied to the heating resistors and hence the heat to the furnace is correspondingly regulated by the current-controlling effect of the A. C. winding 56.

It will be thus observed that the A. C. winding 56 of the saturable core reactor 50 is connected to the power supply conductors 18 and 20 only when the heating resistors 8, 10 and 12 are in series. Hence, the maximum current through this winding will be less than that supplied to the furnace under any parallel-circuit arrangement which includes two or more of the heating resistors 8, 10 and 12. Not only will the current that the A. C. winding 56 is called upon to handle be less, but the voltage drop across the winding will be much less than the full voltage across the supply conductors, because of the voltage drop across the resistors.

To illustrate the application of my invention, assume that the furnace is rated at 250 kva. and that the voltage across the supply conductors 18 and 20 is 550 volts. At a power factor of unity, 450 amperes will flow in the supply conductors when the heating resistors 8, 10 and 12 are in parallel, and the resistance of each heating resistor is 3⅔ ohms. When these heating resistors are connected in series, a total of 11 ohms is presented, and the maximum current that possibly can flow in the series circuit, under the assumption that the impedance of the A. C. winding 56 could be reduced to zero, is 55 amperes.

If the A. C. winding 56 were connected in series with a parallel arrangement of the resistors 8, 10 and 12, it would have had to be able to carry the full-rated current of 450 amperes and to withstand almost 550 volts. On the basis of cost, a control-reactor for such power would cost several times as much as a reactor required for Fig. 1.

My invention is applicable to any electric heating means having a plurality of heating resistor sections. Fig. 3 is intended to illustrate an application of the invention to a heating means comprising a pair only of heating resistors 100 and 102. Each of these heating resistors comprises a plurality of smaller resistor sections, the former comprising two sections 100a and 100b connected in parallel; and the latter comprising two sections 102a and 102b connected in a parallel branch in series with a third resistor section 102c. Fig. 4 is a simplified diagram.

Power is derived from supply conductors 104 and 106. A first branch circuit 108 is connected to the conductor 104 and to a pair of ends of the heating resistors 100 and 102 which have their remaining or opposite ends directly tied together. The branch circuit 108 includes the contacts 110 of a contactor 112 having electromagnetic operating coil 114.

A second branch circuit 116 has one end tied to the supply conductor 106, and the other end tied to the remaining ends of the heating resistors 100 and 102. This second branch circuit 116 includes contacts 118 of a contactor 120 having an electromagnetic operating coil 122.

A third branch circuit 124 has an end tied to the supply conductor 106, and its other end to an end of the branch circuit 108, as shown in Fig. 3. The third branch circuit 124 includes the variable impedance A. C. winding 126 of a saturable core reactor 128, and contacts 130 of a contactor 132 having an electromagnetic operating coil 134. The saturable core reactor 128 has a D. C. control winding 136.

Fig. 3 also differs from the embodiment shown in Figs. 1 and 2 in that separate temperature responsive means are provided for controlling the circuit arrangement between the heating resistors and for controlling the impedance of the saturable core reactor 128. To this end, a temperature responsive device 140, which corresponds to the thermocouple 76 of Fig. 2, operates a regulating means 142 that regulates the current in a D. C. circuit 144 for the direct-current control winding 136 of the saturable core reactor 128.

Means for controlling the connection-arrangement of the heating resistors 100 and 102 comprises a separate temperature responsive device 146 that takes a measure of the heating needed by the furnace and correspondingly controls a control device 150 in the nature of a relay with contacts 152. The temperature-reponsive device 148 causes the control device 150 to raise its contact 152 when the temperature falls below a predetermined value, and to drop its contact when the temperature rises to a desired value somewhat below the operating range of the furnace.

With the temperature low and the contact 152 raised, an energizing circuit 154 for the electromagnetic operating coils 114 and 122 of the contactors 112 and 120, respectively, is energized; whereas a circuit 156 for the operating coil 134 of the contactor 132 is deenergized. Consequently, the branch circuits 108 and 116 are closed and the branch circuit 124 is open. The heating resistors 100 and 102 are connected in parallel through circuit arrangements which should be obvious to one skilled in the art. The regulating means 142 is entirely without effect while the heating resistors are parallelly connected to the supply conductors 104 and 106.

When the temperature, as indicated on the temperature responsive means 146, reaches the desired level, the control relay 150 is deenergized and its contact 152 drops, thereby deenergizing the circuit 154 for the operating coils 114 and 122 of the contactors 112 and 120, respectively, and energizing the circuit 156 for the operating coil 134 of the contactor 132. As a result, the contacts 130 close, completing the branch circuit 124 and resulting in a series circuit-arrangement across the supply conductors 104, 106 as follows: the supply conductor 104, the heating resistor 100, the heating resistor 102, the contacts 130, the variable impedance A. C winding 126, and the supply conductor 106. Hence in this embodiment the regulating means under control of the thermocouple 140 comes into operation only when the temperature of the furnace is within the operating range for regulating purposes as determined by the second temperature responsive device 146. The finer regulation of the furnace temperature is done through the temperature responsive device 140. It is to be observed that in this embodiment as in the earlier one, the A. C. winding 126 of the saturable core reactor operates for regulating purposes only when in a series-circuit arrangement with a plurality of heating resistors.

Fig. 4 is a simplified line diagram of Fig. 3 for indicating the electrical connections in a simplified form so that the relation of a diagram such as shown in Fig. 4 to a more detailed system such as shown in Fig 3 will be more readily understood.

Figure 5:
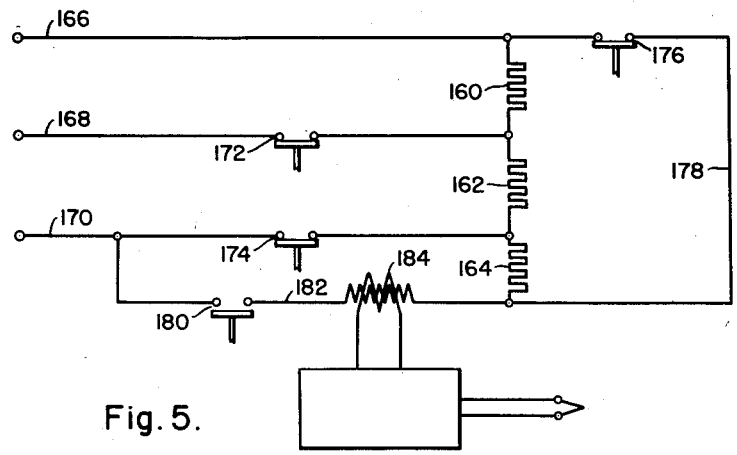
Figs. 5 and 6 are simplified line diagrams of embodiments of my invention utilized in a three-phase power supply.
Figure 6:
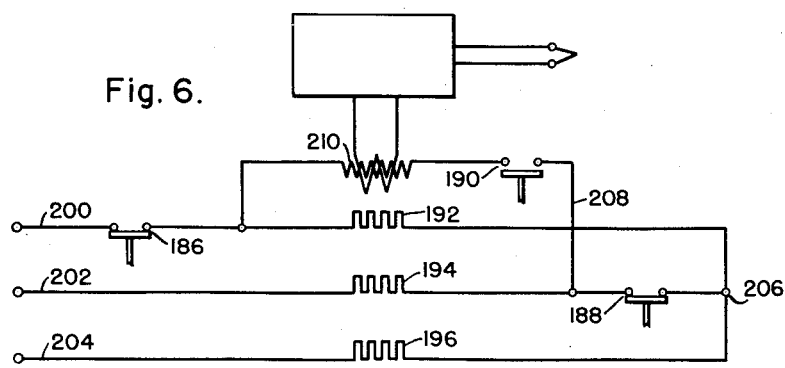

As will be apparent from Figs. 5 and 6, the principles of my invention can be applied to multiphase A. C. systems. Figs. 5 and 6 show three phase systems in a simplified form after the fashion of Fig. 4. In accordance with the systems of Figs. 5 and 6, the heating resistors are connected directly to a three-phase power supply line when the heat demand of the furnace is high, and to a single-phase of the line when the heat demand is comparatively low. Such a system would balance the load in the three phase power supply line under high demand conditions when a furnace is warming up, and impose a light single-phase demand after the furnace has warmed-up Such systems would be advantageous in connection with holding furnaces, soaking pits, baking ovens, or any other applications which are shut-down overnight or week-ends and it is wished to bring them into operation with a minimum delay.

In Fig. 5, the furnace heating-resistors 160, 162 and 164 are adapted to be connected directly in delta to a three-phase line comprising phase-conductors 166, 168 and 170. To this end, magnetically operated contactors having contacts 172, 174 and 176 are connected as shown, with the contacts 172 and 174 in the power supply conductors 168 and 170, respectively, and the contacts 176 in a circuit 178 tying an end of the heating-resistor 164 to the power supply conductor 166. When these contacts 172, 174 and 176 are closed, the heating-resistors 160, 162 and 164 are delta-connected to the line.

When the temperature of the furnace approaches or reaches the desired level, the contacts 172, 174 and 176 are opened and contacts 180 in a circuit 182 closed. An obvious single phase energizing circuit is completed that extends from the conductor 170, through closed contacts 180, the A. C. winding of a temperature-regulatable saturable reactor 184, and the heating resistors 164, 162 and 160 in series, to the conductor 166. It is, of course, to be understood that the contacts 172, 174 and 176 are closed while contacts 180 are open, and vice versa; and the operating condition of the contacts and the saturable core reactor 184 are automatically controlled in a manner that includes the principles disclosed in connection with the prior embodiments.

Fig 6 shows, in simplified form, furnace heating-resistors connectible in Y or star to a three-phase power line for high heat demand, and connectible in series across a single-phase of the line for a regulatable lower heat demand. This system has the advantage over that of Fig. 4 in that it requires one less contactor. When the contactor-contacts 186 and 188 are closed and the contacts 190 open, the heating resistors 192, 194 and 196 are connected in Y to the three-phase line comprising power supply conductors 200, 202 and 204, the Y connection having a neutral or star point 206. When the contacts 186 and 188 are open and the contacts 190 closed, the heating resistors are in series across the conductors 202 and 204 through the branch circuit 208 which includes the contacts 190 and the A. C. winding of the temperature-regulatable saturable core reactor 210. It is to be observed that this branch circuit is connectible and disconnectible, by the contacts 190, to ends of heating resistors 192 and 194. The series circuit can be traced as follows: the conductor 202, the heating resistor 194, the branch circuit 208, the heating resistor 192, the neutral point 206, the heating resistor 196 and the conductor 204.

While I have described my invention in forms which are at present preferred, it is obvious that the principles of my invention have wide application and can be embodied in different forms with different numbers of resistors.

I claim as my invention:

1. An electric heating means comprising three-phase power supply conductors; a plurality of heating resistors, there being a resistor for each phase; controllable circuit-controlling means connecting said heating resistors directly to said power supply conductors with a heating resistor for each phase; additional controllable circuit-controlling means, including a branch circuit having the alternating-current winding of a saturable core reactor, cooperating with the first said circuit-controlling means for changing the aforesaid connections of said heating resistors and connecting all of said heating resistors solely in series with said branch and across a pair of said power supply conductors, said saturable core reactor having a D. C. control winding; and temperature-responsive means selectively operable on said circuit-controlling means, and controlling the current in said D. C. control winding.

2. An invention including that of claim 1 but characterized by said circuit-controlling means comprising a pair of contacts in each of a pair of said power supply conductors operable to place the first said heating resistors in delta across the power supply conductors.

3. An invention including that of claim 1 but characterized further by said circuit controlling means being operable to place the first said heating resistors in Y across the power supply conductors, and said branch circuit being connected to an end of a first heating resistor which is connectible to one of said power supply conductors, and to an end of a second heating resistor which is connectible to the star point of the Y.

4. An electric heating means of a type described comprising, in combination, a saturable core reactor having a variable impedance winding and a D. C. control winding, a plurality of A. C. supply conductors, a plurality of heating resistors, the number of heating resistors being at least as large as the number of said supply conductors, a direct connection between an end of a first heating resistor and an end of a second heating resistor, a branch circuit connecting a first of said supply conductors to the other end of said first heating resistor, said branch circuit including openable and closeable contacts, a second branch circuit from said first supply conductor to the other end of said second heating resistor, said second branch circuit including, in series, openable and closeable contacts and the variable impedance winding of said saturable core-reactor, and temperature-responsive means operable for operating said contacts so that the first of said contacts is open while the other is closed, and vice versa.

5. The electric heating means according to claim 4, in which said temperature responsive means is operable through said contacts to connect a number of said plurality of heating resistors in a plurality of different parallel circuits across said alternating-current supply conductors, or to connect all of said heating resistors solely in a series circuit across a pair of said alternating-current supply conductors.

6. The electric heating means according to claim 4, in which there are provided circuits including said contacts selectively operable to different positions for connecting all of said heating resistors solely in a series circuit which includes said variable impedance winding or in a parallel circuit arrangement excluding said variable impedance winding, and said temperature responsive means automatically controlling the selective operation of said contactors and contacts.

7. The electric heating means in accordance with claim 4 for use in an electric furnace, there being provided a variable current direct-current circuit which includes said direct-current control winding, and said temperature responsive means includes a device responsive to the temperature of said furnace for controlling the current in said variable current direct-current circuit, whereby to regulate the impedance of said variable impedance winding.

8. The electric heating means in accordance with claim 4, for use in an electric furnace system, said plurality of heating resistors being used to heat said furnace there being provided a plurality of tying conductors including said direct connection directly connecting an end of each of said heating resistors to an end of a different one of said heating resistors, a third branch circuit including separable contacts across the opposite ends of said heating resistors, and another of said supply conductors being connected to the other end of said first heating resistor.

9. The heating means including that of claim 8 but further characterized by said temperature responsive means which is operable to place part of the separable contacts of said third branch circuit in open position when the openable and closable contacts are in open position in said branch circuit connecting the first of said supply conductors to said other end of said first heating resistor, and which is operable to place the latter said contacts and said part of said separable contacts in closed position together.

10. An invention including that of claim 9 but further characterized by a variable control circuit for said control winding, and said temperature responsive means including means regulating said variable control circuit, whereby to vary the impedance of said variable-impedance winding.

11. The electric heating means in accordance with claim 4, in which there are provided a plurality of circuit-connections including contactors and said openable and closable contacts associated with said heating resistors and selectively controllable to connect a number of said resistors in a plurality of different parallel circuits across a plurality of said alternating-current supply conductors, or to connect all of said heating resistors solely in a series circuit across a pair of said supply conductors, depending on the positions of said contactors, means for selectively positioning said contactors so as to place said variable impedance winding in said series circuit, and to exclude it from said parallel circuits, and said temperature-responsive means controlling said variable impedance winding.

12. Apparatus according to claim 4 characterized by the fact that the contacts of the first and second branch circuits are associated with said heating resistors and selectively operable to connect a number of the heating resistors in a plurality of different parallel circuits across a plurality of power supply conductors or to connect all of said heating resistors solely in series circuit across a pair of said power-supply conductors, depending on the positions of said contacts and by temperature responsive means which substantially simultaneously operates said contacts.

13. An electric furnace system comprising a furnace having a plurality of heating resistors for heating said furnace according to claim 4 characterized by the fact that the temperature responsive means automatically controls the selective operation of the contacts.

14. An invention including that of claim 13 but further characterized by a variable current direct-current circuit including the direct-current control winding of the reactor, and by temperature-responsive means which includes a device responsive to the temperature of said furnace for controlling the current in said variable current direct-current circuit, whereby to regulate the impedance of said variable impedance winding.

15. An electric furnace system comprising a furnace having a plurality of heating resistors for heating said furnace; according to claim 4 characterized by a number of tying conductors directly connecting an end of each of said heating resistors to an end of a different one of said heating resistors; and by the fact that the first mentioned branch circuit connects the first of the supply conductors to a first of said tying conductors that is at an end of a first heating resistor; and by the further fact that the second of the supply conductors is connected to the other end of the last said heating resistor; and further characterized by a third branch circuit including separable contacts across the opposite ends of said heating resistors.

16. An invention including that of claim 15 but further characterized by means controlled by said temperature responsive means for placing the last said contacts in open position and the other of said contacts in closed position, and vice versa.

17. An invention including that of claim 16 but further characterized by a variable control circuit for said control winding, and said temperature responsive means including means regulating said variable control circuit, whereby to vary the impedance of said variable-impedance winding.

18. An electric heating means as defined in claim 4 but further characterized by said temperature responsive means controls the operation of the saturable core reactor.

JAMES L. REED.

REFERENCES CITED

The following references are of record in the file of this patent:

UNITED STATES PATENTS

| Number | Name | Date |
|---|---|---|
| 1,612,004 | Weed | Dec. 28, 1926 |
| 1,625,380 | Talley | Apr. 19, 1927 |
| 1,638,857 | Keene | Aug. 16, 1927 |
| 1,798,678 | Keller | Mar. 31, 1931 |
| 1,871,697 | James | Aug. 16, 1932 |
| 2,276,822 | Bowman et al. | Mar. 17, 1942 |
| 2,367,619 | Schneider | Jan. 16, 1945 |
| 2,422,958 | Embry | June 24, 1947 |
| 2,445,454 | Puchlowski | July 20, 1948 |